March 31, 1959

M. BELAMIN 2,880,387

FLUX REVERSAL CIRCUIT FOR RECTIFIERS

Filed Nov. 15, 1955

FIG. 1.

FIG. 2.

INVENTOR.
MICHAEL BELAMIN

BY Ostrolenk, Faber,
Gerb & Soffen
ATTORNEYS

United States Patent Office 2,880,387
Patented Mar. 31, 1959

2,880,387

FLUX REVERSAL CIRCUIT FOR RECTIFIERS

Michael Belamin, Nurnberg, Germany, assignor to Siemens-Schuckertwerke A.G., Berlin, Germany, a corporation of Germany Application November 15, 1955, Serial No. 546,901

Claims priority, application Germany November 30, 1954

15 Claims. (Cl. 321—48)

My invention relates to an improvement in flux reversal circuits for mechanical rectifiers as shown in co-pending applications Serial No. 486,243 filed February 4, 1955 and Serial No. 544,526 filed November 2, 1955.

As described in each of the above mentioned applications and as may be seen in co-pending application Serial No. 423,358 filed April 15, 1954, now Patent No. 2,817,805, mechanical rectifiers or electromagnetic rectifiers energize a D.-C. load from an A.-C. source by synchronously opening and closing a mechanical contact in series with the A.-C. source and D.-C. load. Hence by closing the contact when the A.-C. source becomes positive and opening the contact before the A.-C. source becomes negative, it is seen that an average power will be transferred to the D.-C. load.

It is, however, essential that the contact which operates 216,000 times per hour when rectifying a 60 cycle source be opened or closed on very low current values if this contact is to have any appreciable life.

For this reason a commutating reactor, which is fully described in the above mentioned co-pending application Serial No. 423,358 filed April 15, 1954, must be connected in series with the contact. Commutating reactors which have cores of highly saturable type material will therefore provide low current steps in the region at which the contact is to be operated. That is to say, they will remain unsaturated and hold the load current to the magnetizing current of the reactor which is a very small value at the time in which the contact is to be operated.

It is possible to control the voltage output of a mechanical rectifier by varying the amount of flux which is to be reversed in the commutating reactor core upon closure of the series connected contact. If therefore a low voltage output is desired, the commutating reactor is adjusted to be unsaturated for a relatively long period of time after contact closure. Because of this, the A.-C. voltage will fall across the commutating reactor until it is saturated and only then will flow across the D.-C. load.

It is therefore seen that the voltage falling across the load when the commutating reactor is unsaturated for a relatively long time will be greatly reduced from a maximum value which will be given by a minimum length of unsaturation of the commutating reactor.

The above mentioned co-pending application Serial No. 486,243 filed February 4, 1955 describes a flux reversal circuit for controlling the degree of flux reversal required at the commutating reactor after contact closure. In this application Serial No. 486,243, a circuit is set forth which includes a diode, a saturable reactor, an auxiliary A.-C. voltage source and a flux reversal winding or auxiliary winding on the commutating reactor core. These components are connected in series, and as is described in application Serial No. 486,243 the commutating reactor flux reversal winding is energized only when the A.-C. voltage is in a direction to pass current through the diode and the auxiliary saturable reactor is saturated. This auxiliary saturable reactor is then provided with a D.-C. biasing winding in which the length of unsaturation thereof may be controlled.

Therefore it is seen that by controlling the length of unsaturation of the saturable reactor which is connected in series with the commutating reactor flux reversal winding, that the voltage time integral which is impressed upon the commutating reactor flux reversal winding may be controlled. Hence if the D.-C. bias of the saturable reactor is adjusted to provide a relatively large amount of flux reversal for the saturable reactor, then a relatively small voltage time integral will be impressed across the commutating reactor flux reversal winding thereby reversing only a small amount of flux in the commutating reactor core, which in turn will allow a relatively high output voltage of the mechanical rectifier.

Conversely, if the saturable reactor has only a small amount of flux reversed, then a relatively large voltage time integral will be impressed upon the commutating reactor flux reversal winding to thereby cause a relatively low voltage output of the mechanical rectifier.

As then set forth in co-pending application Serial No. 544,526, filed November 2, 1955, means are required in the flux reversal circuit to prevent a relatively high voltage from being impressed across the commutating reactor main winding from the flux reversal circuit during the unsaturated interval which would in turn be impressed across the open contact associated with the commutating reactor which would already have the relatively high phase voltage appearing thereacross.

That is to say, the flux reversal circuit of copending application Serial No. 486,243 filed February 4, 1955, will induce seriously high voltages across the corresponding phase contact since it is activated at a time relatively late in the half-cycle during which the contact is open.

The principle of my invention is to provide a flux reversal circuit utilizing a saturable reactor which is connected in parallel with a commutating reactor flux reversal winding. Therefore, so long as the saturable reactor is unsaturated, a voltage time integral will appear across the commutating reactor flux reversal winding and when the saturable reactor saturates, the commutating reactor flux reversal winding will be short-circuited and the flux reversal process in the commutating reactor core will stop.

It is therefore seen that the flux reversal process in the commutating reactor is initiated with the unsaturation of the saturable reactor whereas in the above mentioned co-pending application Serial No. 486,243 it was only after the saturable reactor saturates that the flux reversal process is initiated.

In view of my novel circuit, a greater length of time is now available for the flux reversal process and the voltage induced into the commutating reactor main winding which is subsequently impressed across its associated contact will no longer increase the contact voltage to a dangerous value.

Control of the output voltage is now obtained in the same manner as was previously obtained in that the length of unsaturation of the saturable reactor is controlled by the D.-C. bias, this value corresponding to the length of time during which a voltage time integral will be impressed across the commutating reactor flux reversal winding.

Accordingly, a primary object of my invention is to provide a flux reversal circuit for commutating reactors which utilizes a saturable reactor connected in parallel with a commutating reactor winding.

Another object of my invention is to provide a flux reversal circuit for commutating reactors which is effective to reverse the flux of the commutating reactor at a relatively early time in the half-cycle during which contact of the corresponding phases opens.

Another object of my invention is to provide a circuit for controlling the output voltage of a contact operated rectifying device which includes a saturable reactor connected in parallel with a controlling commutating reactor whereby variation of the length of unsaturation of the saturable reactor is effective to cause variation in the output voltage of the rectifier.

Another object of my invention is to adjustably control the amount of flux reversal of a commutating reactor by providing a parallel connected saturable reactor having a means to adjust its length of unsaturation.

These and many other objects of my novel invention will become apparent from the following description when taken in connection with the drawings in which Figure 1 represents one form of my novel invention when taken in conjunction with a mechanical rectifier having mechanically driven contacts.

Figure 2 is a second embodiment of my novel invention when taken in conjunction with the rectifying device of Figure 1.

Referring now to Figures 1 and 2, the rectifying device per se is shown as a three phase mechanical rectifier. It will, however, be apparent to those skilled in the art that my novel circuit can also be applied to an electromagnetic rectifier in substantially the same manner as will be hereinafter indicated.

Similarly, any one skilled in the art of electromagnetic and mechanical rectifiers will, from the following description, be able to apply my novel invention to any type of connection utilized other than that shown in Figures 1 and 2.

In these figures the main power source 25 is applied to the primary winding 27a, 27b and 27c of the star connected three phase transformer, indicated generally at 26. The secondary windings 11a, 11b and 11c of the transformer 25 are respectively connected to the main windings 12a, 12b and 12c which have mechanically operated contacts 13a, 13b and 13c in series therewith. A mechanical driving means is schematically shown as a motor M, which is operative to operate the contacts 13a, 13b and 13c into and out of engagement in synchronism with the frequency of the input voltage source 25. This type of mechanism is fully described in copending application Serial No. 307,024 filed August 29, 1952, now Patent No. 2,845,592, and will not be further described herein.

The series combination of mechanically operated contacts 13a, 13b and 13c and the main commutating reactor windings 12a, 12b and 12c are in turn connected to one end of a load 14. The opposite end of the load 14 is then connected to a smoothing choke 15 which in turn is connected to the secondary neutral of the transformer 26.

I have illustrated my invention as applied only to phase A of the rectifiers of Figures 1 and 2, as it will be apparent that the identical circuitry will also be applied to the commutating reactors of phases B and C.

Referring now to Figure 1, I have illustrated my novel flux reversal circuit as including the transductor or saturable reactor shown generally at 16 and including a core of saturable type material 17, an input winding 18, and output winding 19. The input winding 18 is then shown as being energized from a D.-C. voltage source 20 through the series connected smoothing choke 21 and the variable resistor 22. The commutating reactor 12a is then shown as including a flux reversal winding 23 which is connected in parallel with the saturable reactor output winding 19 through the diodes 24 and 28.

The source of flux reversal energization is then shown as being taken across the phases A and B and applied through a series connected current limiting impedance, such as resistor 29. It is therefore seen that a first and second parallel circuit is now provided, the first comprising the saturable reactor output winding 19 and the diode 24, and the second comprising the commutating reactor flux reversal winding 23 and the diode 28. It is now possible to consider the operation of my novel flux reversal circuit as shown in Figure 1.

At the time the potential of phase A exceeds that of phase B, it is seen that a current will try to flow through the circuit including the diode 24, transductor output winding 19 and resistor 29, as well as the parallel circuit including the diode 28, flux reversal winding 23 and resistor 29. Upon initiation of this current, however, the transductor core 17, which has had a certain amount of flux previously reversed by the D.-C. bias 20 operating through the transductor input winding 18, will unsaturate.

In view of the unsaturation of the core 17, an extremely high voltage will appear across the winding 19 and a flux reversal current will flow through the diode 28 and flux reversal winding 23, this current being limited by the magnetizing current of the winding 23.

Clearly therefore the flux of the commutating reactor of phase A will be reversed until the saturable reactor or transductor 17 saturates in view of the voltage appearing across the winding 19. Upon saturation of the core 17, the flux reversal winding 23 of the commutating reactor of phase A is effectively short-circuited and a relatively high current will now flow through the circuit including the diode 24, winding 19 and the current limiting resistor 29. Thus the length of time that the volt seconds will be impressed across the winding 23 is determined by the length of time that the transductor core 17 remains unsaturated.

It is to be noted that the flux reversal interval of the commutating reactor of phase A occurs relatively early in the half-cycle during which the contact 13a is open. It is in fact apparent that the flux reversal will begin 60° before phase A and phase B begin to commutate whereas in the previously used flux reversal circuit shown in copending application Serial No. 486,243, the flux reversal process begins only after a saturable reactor core, which is connected in series with the flux reversal winding, is saturated.

Because of this, the voltage which is transformed from winding 23 to winding 12a of commutating reactor of phase A will be impressed across the contact 13a which at this early time is of a relatively small magnitude and the total voltage across contact 13a will be below any dangerous value.

Voltage control of the circuit of Figure 1 is clearly effected by a variation in the D.C. energization of the input winding 18 of the transductor core 17. Hence by varying the resistance of resistor 22, it is clear that the length of unsaturation of the core 17 after phase A becomes positive with respect to phase B, will be controlled to thereby control the total voltage time integral impressed across the winding 23 which in turn controls the output voltage of the rectifier to the load 14.

Figure 2 presents a variation of my novel principle whereby an auxiliary flux reversal winding is not used or required for the commutating reactor.

Another variation shown in Figure 2 is that an auxiliary alternating voltage source shown generally at 30 is utilized to variably control the point at which unsaturation of the saturable reactor core 17 is initiated. That is to say, in the case of Figure 2 the voltage which is induced from winding 32 to the winding 33 of the auxiliary transformer 30, which is energized from an auxiliary A.-C. source 31, is superimposed upon the phase voltage appearing between phases A and B which could thereby adjustably control the point at which the potential between points A and B becomes positive.

The operation of the circuit of Figure 2 is substantially identically described in conjunction with the circuit of Figure 1 where the portion 34 of winding 12a operates in a manner as did winding 23 of Figure 1. That is to say, it is clear that a parallel connected transductor is being utilized as seen in the parallel connection of the transductor output winding 19 and the commutating reactor winding 34 which is effective for flux reversal of the commutating reactor core.

Although I have shown a preferred embodiment of my invention, it will now be obvious that many variations and modifications will occur to those skilled in the art, and I prefer to be bound not by the specific disclosure herein but only by the appended claims.

I claim:

1. In a rectifier for energizing a D.-C. load from an input A.-C. source; said rectifier comprising a pair of cooperable contacts, means for synchronously driving said contacts between an engaged and a disengaged position and a commutating reactor; said commutating reactor comprising a core of saturable type material, a main winding and a flux reversal winding; said A.-C. source, D.-C. load, pair of cooperable contacts and commutating reactor main winding being connected in series; a flux reversal circuit; said flux reversal circuit comprising a saturable reactor having a core of saturable material, an input and an output winding, a source of A.-C. voltage and a first and second diode; said flux reversal winding of said commutating reactor being connected in series with said first diode; said saturable reactor output winding being connected in series with said second diode; said series connections of said flux reversal winding and first diode and said output winding and said second diode being connected in parallel with said source of A.-C. voltage, said first and second diodes being connected to have currents flowing in their forward direction to oppose one another.

2. In a rectifier for energizing a D.-C. load from an input A.-C. source; said rectifier comprising a pair of cooperable contacts, means for synchronously driving said contacts between an engaged and a disengaged position and a commutating reactor; said commutating reactor comprising a core of saturable type material, a main winding and a flux reversal winding; said A.-C. source, D.-C. load, pair of cooperable contacts and commutating reactor main winding being connected in series; a flux reversal circuit; said flux reversal circuit comprising a saturable reactor having a core of saturable material, an input and an output winding, a source of A.-C. voltage, and a variable source of D.-C. voltage, and a first and second diode; said flux reversal winding of said commutating reactor being connected in series with said first diode; said saturable reactor output winding being connected in series with said second diode; said series connections of said flux reversal winding and first diode and said output winding and said second diode being connected in parallel with said source of A.-C. voltage; said source of variable D.-C. voltage being connected to said saturable reactor input winding for varying the length of unsaturation of said saturable reactor, said first and second diodes being connected to have currents flowing in their forward direction to oppose one another.

3. In a rectifier for energizing a D.-C. load from an input A.-C. source; said rectifier comprising a pair of cooperable contacts, means for synchronously driving said contacts between an engaged and a disengaged position and a commutating reactor; said commutating reactor comprising a core of saturable type material, a main winding and a flux reversal winding; said A.-C. source, D.-C. load, pair of cooperable contacts and commutating reactor main winding being connected in series; a flux reversal circuit; said flux reversal circuit comprising a saturable reactor having a core of saturable material, an input and an output winding, a source of A.-C. voltage, and a variable source of D.-C. voltage, and a first and second diode; said flux reversal winding of said commutating reactor being connected in series with said first diode; said saturable reactor output winding being connected in series with said second diode; said series connections of said flux reversal winding and first diode and said output winding and said second diode being connected in parallel with said source of A.-C. voltage; said source of variable D.-C. voltage being connected to said saturable reactor input winding for varying the length of unsaturation of said saturable reactor; said commutating reactor flux reversal winding being effective to reverse the flux of said commutating reactor core when said saturable reactor core is unsaturated, said commutating reactor flux reversal winding being substantially short-circuited when said saturable reactor core is saturated, said first and second diodes being connected to have currents flowing in their forward direction to oppose one another.

4. In a rectifier for energizing a D.-C. load from an input A.-C. source; said rectifier comprising a pair of cooperable contacts, means for synchronously driving said contacts between an engaged and a disengaged position and a commutating reactor; said commutating reactor comprising a core of saturable type material, a main winding and a flux reversal winding, said A.-C. source, D.-C. load, pair of cooperable contacts and commutating reactor main winding being connected in series; a flux reversal circuit; said flux reversal circuit comprising a saturable reactor having a core of saturable material, an input and an output winding, a source of A.-C. voltage, and a variable source of D.-C. voltage, an impedance, and a first and second diode; said flux reversal winding of said commutating reactor being connected in series with said first diode; said saturable reactor output winding being connected in series with said second diode; said series connections of said flux reversal winding and first diode and said output winding and said second diode being connected in parallel with said source of A.-C. voltage; said source of variable D.-C. voltage being connected to said saturable reactor input winding for varying the length of unsaturation of said saturable reactor, said impedance being effective to limit current upon saturation of said saturable reactor core, said first and second diodes being connected to have currents flowing in their forward direction to oppose one another.

5. In a rectifier for energizing a D.-C. load from an input A.-C. source; said rectifier comprising a pair of cooperable contacts, means for synchronously driving said contacts between an engaged and a disengaged position and a commutating reactor; said commutating reactor comprising a core of saturable type material, a main winding and a flux reversal winding; said A.-C. source, D.-C. load, pair of cooperable contacts and commutating reactor main winding being connected in series; a flux reversal circuit; said flux reversal circuit comprising a saturable reactor having a core of saturable material, an input and an output winding, a source of A.-C. voltage and a first and second diode; said A.-C. voltage source being constructed to have a voltage which leads the voltage of said input A.-C. source; an impedance, said impedance being effective to limit current upon saturation of said saturable reactor core; said flux reversal winding of said commutating reactor being connected in series with said first diode; said saturable reactor output winding being connected in series with said second diode; said series connections of said flux reversal winding and first diode and said output winding and said second diode being connected in parallel with said source of A.-C. voltage, said saturable reactor being unsaturated when said A.-C. voltage source initiates current flow through said second diode, said commutating reactor being unsaturated responsive to unsaturation of said saturable reactor, said first and second diodes being connected to have currents flowing in their forward direction to oppose one another.

6. In a rectifier for energizing a D.-C. load from an input A.-C. source; said rectifier comprising a pair of cooperable contacts, means for synchronously driving said contacts between an engaged and a disengaged position and a commutating reactor; said commutating reactor comprising a core of saturable type material, and a main winding; said A.-C. source, D.-C. load, pair of cooperable contacts and commutating reactor main winding being connected in series; a flux reversal circuit; said flux reversal circuit comprising a saturable reactor having a core of saturable material, an input and an output winding, a source of A.-C. voltage and a first and second diode; at least a portion of said main winding of said commutating reactor being connected in series with said first diode; said saturable reactor output winding being connected in series with said second diode; said series connections of said portion of said commutating reactor winding and first diode and said output winding and said second diode being connected in parallel with said source of A.-C. voltage, said first and second diodes being connected to have currents flowing in their forward direction to oppose one another.

7. In a rectifier for energizing a D.-C. load from an input A.-C. source; said rectifier comprising a pair of cooperable contacts, means for synchronously driving said contacts between an engaged and a disengaged position and a commutating reactor; said commutating reactor comprising a core of saturable type material, and a main winding; said A.-C. source, D.-C. load, pair of cooperable contacts and commutating reactor main winding being connected in series; a flux reversal circuit; said flux reversal circuit comprising a saturable reactor having a core of saturable material, an input and an output winding, a source of A.-C. voltage and a first and second diode; at least a portion of said main winding of said commutating reactor being connected in series with said first diode; said saturable reactor output winding being connected in series with said second diode; said series connections of said portion of said commutating reactor winding and first diode and said output winding and said second diode being connected in parallel with said source of A.-C. voltage, an impedance, said impedance being effective to limit current upon saturation of said saturable reactor core, said first and second diodes being connected to have currents flowing in their forward direction to oppose one another.

8. In a rectifier for energizing a D.-C. load from an input A.-C. source; said rectifier comprising a pair of cooperable contacts, means for synchronously driving said contacts between an engaged and a disengaged position and a commutating reactor; said commutating reactor comprising a core of saturable type material, and a main winding; said A.-C. source, D.-C. load, pair of cooperable contacts and commutating reactor main winding being connected in series; a flux reversal circuit; said flux reversal circuit comprising a saturable reactor having a core of saturable material, an input and an output winding, a source of A.-C. voltage and a first and second diode; at least a portion of said main winding of said commutating reactor being connected in series with said first diode; said saturable reactor output winding being connected in series with said second diode; said series connections of said portion of said commutating reactor winding and first diode and said output winding and said second diode being connected in parallel with said source of A.-C. voltage; an impedance, said impedance being effective to limit current upon saturation of said saturable reactor core, said A.-C. voltage source being constructed to have a voltage which leads the voltage of said input A.-C. source, said saturable reactor being unsaturated when said A.-C. voltage source initiates current flow through said second diode, said commutating reactor being unsaturated responsive to unsaturation of said saturable reactor, said first and second diodes being connected to have currents flowing in their forward direction to oppose one another.

9. In a rectifier for energizing a D.-C. load from an input A.-C. source; said rectifier comprising a pair of cooperable contacts, means for synchronously driving said contacts between an engaged and a disengaged position and a commutating reactor; said commutating reactor comprising a core of saturable type material, and a main winding; said A.-C. source, D.-C. load, pair of cooperable contacts and commutating reactor main winding being connected in series; a flux reversal circuit; said flux reversal circuit comprising a saturable reactor having a core of saturable material; an input and an output winding, a source of A.-C. voltage and a variable source of D.-C. voltage, and a first and second diode; at least a portion of said main winding of said commutating reactor being connected in series with said first diode; said saturable reactor output winding being connected in series with said second diode; said series connections of said portion of said commutating reactor winding and first diode and said output winding and said second diode being connected in parallel with said source of A.-C. voltage; said source of variable D.-C. voltage being connected to said saturable reactor input winding for varying the length of unsaturation of said saturable reactor, said first and second diodes being connected to have currents flowing in their forward direction to oppose one another.

10. In a rectifier for energizing a D.-C. load from an input A.-C. source; said rectifier comprising a pair of cooperable contacts, means for synchronously driving said contacts between an engaged and a disengaged position and a commutating reactor; said commutating reactor comprising a core of saturable type material, a main winding and a flux reversal winding; said A.-C. source, D.-C. load, pair of cooperable contacts and commutating reactor main winding being connected in series; a flux reversal circuit; said flux reversal circuit comprising a saturable reactor having a core of saturable material, an input and an output winding, a source of A.-C. voltage, a variable source of D.-C. voltage, and a first and second diode; said flux reversal winding of said commutating reactor being connected in series with said first diode; said saturable reactor output winding being connected in series with said second diode; said series connections of said flux reversal winding and first diode and said output winding and said second diode being connected in parallel with said source of A.-C. voltage; said source of variable D.-C. voltage being connected to said saturable reactor input winding for varying the length of unsaturation of said saturable reactor, said source of A.-C. voltage being adjustable to have an adjustable phase relation with respect to the phase of said input A.-C. source, said first and second diodes being connected to have currents flowing in their forward direction to oppose one another.

11. In a rectifier for energizing a D.-C. load from an input A.-C. source; said rectifier comprising a pair of cooperable contacts, means for synchronously driving said contacts between an engaged and a disengaged position and a commutating reactor; said commutating reactor comprising a core of saturable type material, and a main winding; said A.-C. source, D.-C. load, pair of cooperable contacts and commutating reactor main winding being connected in series; a flux reversal circuit; said flux reversal circuit comprising a saturable reactor having a core of saturable material; an input and an output winding, a source of A.-C. voltage and a variable source of D.-C. voltage, and a first and second diode; at least a portion of said main winding of said commutating reactor being connected in series with said first diode; said saturable reactor output winding being connected in series with said second diode; said series connections of said portion of said commutating reactor winding and first diode and said output winding and said second diode being connected in parallel with said source of A.-C. voltage; said source of variable D.-C. voltage being connected to said saturable reactor input winding for varying the length of unsaturation of said saturable reactor, said source of A.-C. voltage being adjustable to have an adjustable phase relation with respect to the phase of said input A.-C. source, said first and second diodes being connected to have currents flowing in their forward direction to oppose one another.

12. A flux reversal circuit for commutating reactors, said flux reversal circuit including a saturable reactor having an input and an output winding and a core of saturable type material, a source of A.-C. voltage and a commutating reactor winding; circuit connections for connecting said saturable reactor output winding in parallel with said commutating reactor winding and said source of A.-C. voltage whereby said commutating reactor winding is substantially short-circuited by said saturable reactor output winding when said saturable reactor core is saturated.

13. A flux reversal circuit for commutating reactors, said flux reversal circuit including a saturable reactor having an input and an output winding and a core of saturable type material, a source of A.-C. voltage, means to energize said saturable reactor input winding, and a commutating reactor winding; circuit connections for connecting said saturable reactor output winding in parallel with said commutating reactor winding and said source of A.-C. voltage whereby said commutating reactor winding is substantially short-circuited by said saturable reactor output winding when said saturable reactor core is saturated, said means to energize said input winding being constructed to adjustably control the length of unsaturation of said saturable reactor.

14. A flux reversal circuit for commutating reactors, said flux reversal circuit including a saturable reactor having an input and an output winding and a core of saturable type material, a source of A.-C. voltage, means to energize said saturable reactor input winding, a current limiting means and a commutating reactor winding; circuit connections for connecting said saturable reactor output winding in parallel with said commutating reactor winding and said source of A.-C. voltage whereby said commutating reactor winding is substantially short-circuited by said saturable reactor output winding when said saturable reactor core is saturated, said means to energize said input winding being constructed to adjustably control the length of unsaturation of said saturable reactor, said current limiting means being connected in series with said A.-C. voltage source and the parallel connection of said saturable reactor output winding and said commutating reactor winding.

15. In a rectifier for energizing a D.-C. load from an input A.-C. source; said rectifier comprising a rectifying element and a commutating reactor; said commutating reactor comprising a core of saturable type material, a main winding and a flux reversal winding; said A.-C. source, D.-C. load, rectifying element and commutating reactor main winding being connected in series; a flux reversal circuit; said flux reversal circuit comprising a saturable reactor having a core of saturable material, an input and an output winding, a source of A.-C. voltage and a first and second diode; said flux reversal winding of said commutating reactor being connected in series with said first diode; said saturable reactor output winding being connected in series with said second diode; said series connections of said flux reversal winding and first diode and said output winding and said second diode being connected in parallel with said source of A.-C. voltage, said first and second diodes being connected to have currents flowing in their forward direction to oppose one another.

References Cited in the file of this patent

UNITED STATES PATENTS

| 2,188,361 | Koppelmann | Jan. 30, 1940 |
| 2,568,140 | Belamin | Sept. 18, 1951 |
| 2,756,381 | Rolf | July 28, 1956 |